(12) United States Patent
Shihadeh et al.

(10) Patent No.: US 7,177,379 B1
(45) Date of Patent: Feb. 13, 2007

(54) DDR ON-THE-FLY SYNCHRONIZATION

(75) Inventors: Elias Shihadeh, Longmont, CO (US); Redentor Valencia, Longmont, CO (US); Steven Kommrusch, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 645 days.

(21) Appl. No.: 10/425,974

(22) Filed: Apr. 29, 2003

(51) Int. Cl.
*H04L 7/00* (2006.01)
(52) U.S. Cl. ........................................ 375/354; 375/355
(58) Field of Classification Search ................ 375/354, 375/355, 371, 372, 359, 360; 711/167, 105, 711/100; 365/191, 193, 194
See application file for complete search history.

(56) References Cited

U.S. PATENT DOCUMENTS

| | | | |
|---|---|---|---|
| 5,768,177 A | 6/1998 | Sakuragi | |
| 5,920,511 A | 7/1999 | Lee et al. | |
| 5,978,281 A * | 11/1999 | Anand et al. | 365/189.05 |
| 6,016,283 A | 1/2000 | Jeong | |
| 6,031,981 A | 2/2000 | Lee | |
| 6,118,729 A | 9/2000 | Hirabayashi et al. | |
| 6,154,418 A | 11/2000 | Li | |
| 6,166,970 A | 12/2000 | Yun | |
| 6,191,997 B1 | 2/2001 | Son et al. | |
| 6,201,760 B1 | 3/2001 | Yun et al. | |
| 6,205,046 B1 | 3/2001 | Maesako | |
| 6,208,582 B1 | 3/2001 | Kanda et al. | |
| 6,212,113 B1 | 4/2001 | Maeda | |
| 6,215,710 B1 | 4/2001 | Han et al. | |
| 6,240,042 B1 | 5/2001 | Li | |
| 6,279,073 B1 * | 8/2001 | McCracken et al. | 711/105 |
| 6,282,132 B1 | 8/2001 | Brown et al. | |
| 6,286,077 B1 | 9/2001 | Choi et al. | |
| 6,288,971 B1 | 9/2001 | Kim | |
| 6,295,245 B1 | 9/2001 | Tomita et al. | |
| 6,327,205 B1 | 12/2001 | Haq | |
| 6,330,636 B1 | 12/2001 | Bondurant et al. | |
| 6,335,901 B1 | 1/2002 | Morita et al. | |
| 6,337,830 B1 | 1/2002 | Faue | |
| 6,337,832 B1 | 1/2002 | Ooishi et al. | |
| 6,381,194 B2 | 4/2002 | Li | |
| 6,407,963 B1 | 6/2002 | Sonoda et al. | |
| 2001/0033523 A1 | 10/2001 | Hein et al. | |
| 2001/0039602 A1 | 11/2001 | Kanda et al. | |
| 2001/0054135 A1 | 12/2001 | Matsuda | |
| 2002/0003740 A1 | 1/2002 | Chang et al. | |
| 2002/0003746 A1 | 1/2002 | Chnag et al. | |
| 2002/0009004 A1 | 1/2002 | Hamada et al. | |
| 2002/0018396 A1 | 2/2002 | Morita et al. | |
| 2002/0024872 A1 | 2/2002 | Ryan | |

* cited by examiner

*Primary Examiner*—Tesfaldet Bocure

(57) ABSTRACT

Double data rate (DDR) synchronous dynamic random access memory (SDRAM) data is sampled into a synchronization circuit on both rising and falling edges of a data strobe (DQS) signal, into separate latches. A delay calculation and timing synchronization unit determines the location of the data strobe signal relative to rising/falling edges of an internal clock, then decides which sample to transfer into the internal data path and whether to use the rising or falling internal clock edge. Every DDR-SDRAM read transaction is thus automatically synchronized without the need for predetermined delay(s), allowing a wide range of operating frequencies and frequency variations to be accommodated.

22 Claims, 3 Drawing Sheets

DDR ON-THE-FLY SYNCHRONIZATION

TECHNICAL FIELD OF THE INVENTION

The present invention is directed, in general, to memory synchronization and, more specifically, to configurable synchronization of each memory transaction to permit operation at a wide range of frequencies.

BACKGROUND OF THE INVENTION

Double data rate (DDR) synchronous dynamic random access memory (SDRAM) allows data to be transferred from a memory to a processor or bus on both the rising and falling edges of a clock signal. Within DDR-SDRAM systems, data strobe signals (DQS) are transmitted (at least nominally) synchronously with the data bus signals (DQ), but asynchronously with respect to the clock controlling the receiving processor, bus or other receiving device. Accordingly, a synchronization circuit is required to properly receive data from a DDR-SDRAM. Moreover, due to variations in architectures, strobe signals and data signals may not arrive at a synchronization circuit exactly simultaneously, requiring configurable synchronization circuits.

One approach to implementing configurable synchronizer circuit for DDR-SDRAMs employ static predetermined delays of the data strobe signals so that the strobe signals are asserted within a window of time during which the data signals at the synchronizer is valid. However, support for a wide range of operating frequencies is desirable, varying the data rate at the synchronizer from, for example, 166 megatransfers per second (MT/S) to 400 MT/S, or 50 megaHertz (MHz) to 150 MHz. Such strobe signal delay to configure a synchronizer precludes operating the system at clock frequencies different from that specified during selection of the static predetermined delays, and also does not permit any variation in the delay of the data strobe signal or any skew between different data strobe signals.

There is, therefore, a need in the art for a configurable DDR-SDRAM synchronizer permitting operation across a wide range of frequencies, without static pre-setup of strobe signal delay.

SUMMARY OF THE INVENTION

To address the above-discussed deficiencies of the prior art, it is a primary object of the present invention to provide, for use in a data processing system, sampling of double data rate (DDR) synchronous dynamic random access memory (SDRAM) data into a synchronization circuit on both rising and falling edges of a data strobe (DQS) signal, into separate latches. A delay calculation and timing synchronization unit determines the location of the data strobe signal relative to rising/falling edges of an internal clock, then decides which sample to transfer into the internal data path and whether to use the rising or falling internal clock edge. Every DDR-SDRAM read transaction is thus automatically synchronized without the need for predetermined delay(s), allowing a wide range of operating frequencies and frequency variations to be accommodated.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 3A–3B, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
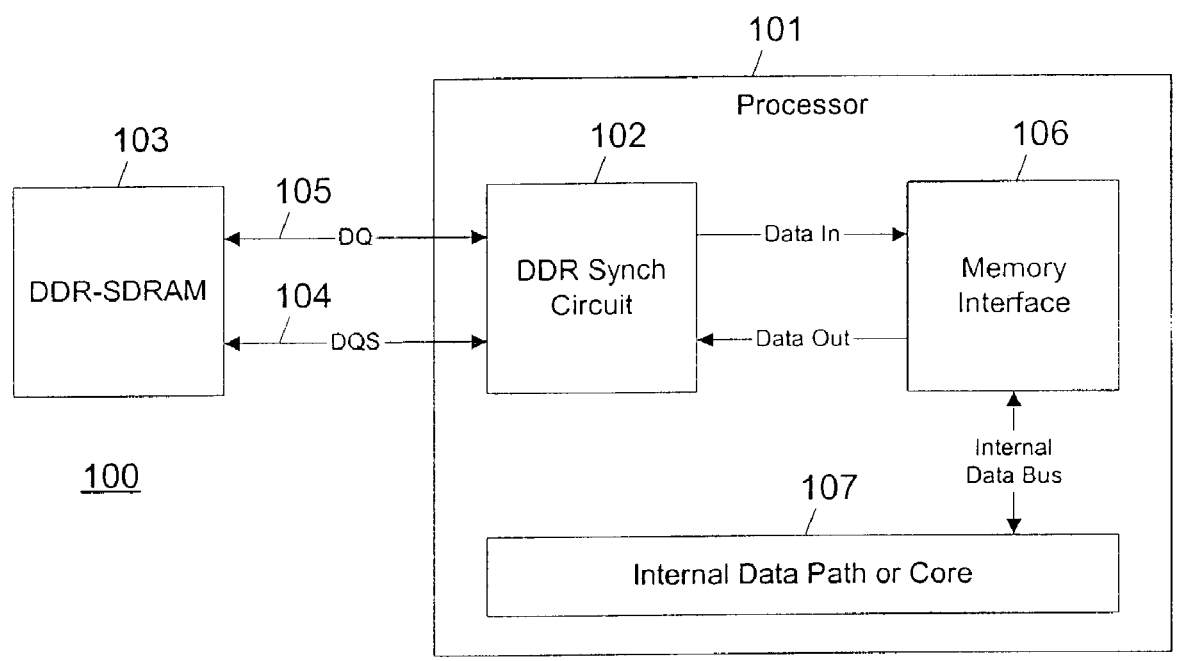
FIG. 1 depicts a data processing system including a configurable synchronizer according to one embodiment of the present invention.

FIG. 1 depicts a data processing system including a configurable synchronizer according to one embodiment of the present invention. Those skilled in the art will recognize that the full construction and operation of a data processing system is not depicted or described herein. Instead, for simplicity and clarity, only so much of the construction and operation of a data processing system as is unique to the present invention or necessary for an understanding of the present invention is depicted and described.

Data processing system 100 includes a processor 101 coupled, via an internal DDR synch circuit 102, to an external DDR-SDRAM memory 103 by signal lines 104 and 105 for transmitting data strobe signals (DQS) and data bus signals (DQ), respectively. Synch circuit 102 transfers data through a memory interface 106 onto (or from) an internal data bus to (or from) an internal data path or processing core 107.

Figure 2:
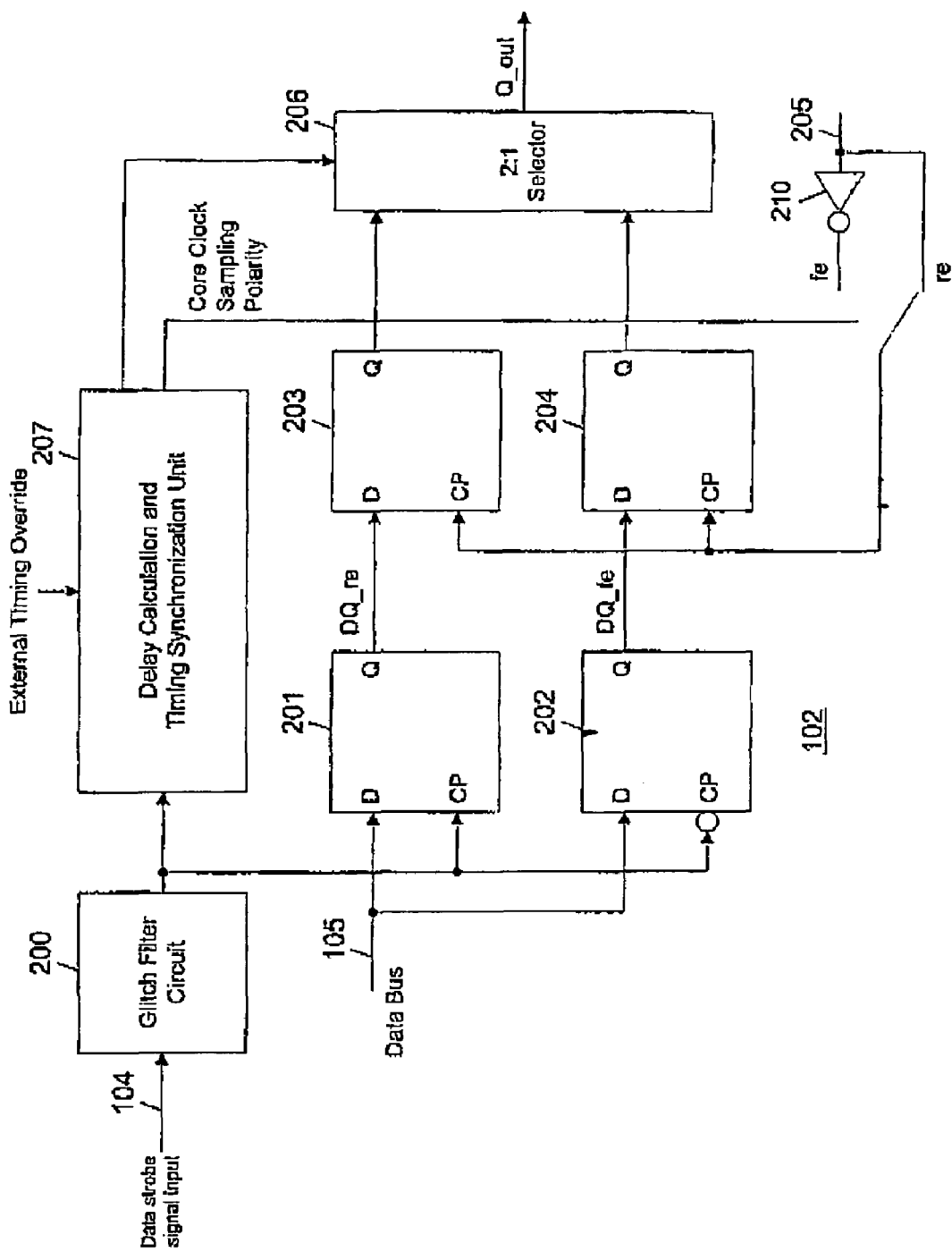
FIG. 2 depicts in greater detail a configurable synchronizer according to one embodiment of the present invention.

FIG. 2 depicts in greater detail a configurable synchronizer according to one embodiment of the present invention. Synch circuit 102 receives the data strobe DQS from the external memory 103 at a glitch filter circuit 200 that inhibits noise or jitter and the data signals DQ at the inputs of each of latches 201 and 202. Latches 201 and 202 are clocked by the glitch filter output and the inverted glitch filter output, respectively. The signal states on data bus DQ when the data strobe DQS is asserted are thus captured by latch 201, while the signal on data bus DQ when the data strobe DQS is de-asserted are captured by latch 202.

In the exemplary embodiment, therefore, latch 201 captures the bus states DQ_re on the rising edge of the data strobe DQS while latch 202 captures the bus states DQ_fe on the falling ede of the data strobe DQS. The outputs of latches 201 and 202 are passed to the inputs of latches 203 and 204, respectively. Latches 203 and 204 are clocked by the processor core clock signal 205, selectively on either the rising edge (re) or the falling edge (fe)(provided via an inverter 210) of the core clock. The outputs of latches 203 and 204 are passed to the inputs of a 2:1 multiplexer or selector 206.

The filtered data strobe output of glitch filter 200 is passed to a delay calculation and timing synchronization unit 207. Delay calculation and timing synchronization unit 207 controls whether latches 203 and 204 are clocked by the rising edge or the falling edge of the processor core clock signal 205. Delay calculation and timing synchronization unit 207 also controls the selection of outputs from latches 203 and 204 by multiplexer 206. The output of multiplexer 206 is passed to the memory interface 106.

In operation, delay calculation and timing synchronization unit 207 detects the start of the data strobe DQS and the relative delay with respect to the processor core clock. Based on this determination, delay calculation and timing synchronization unit 207 which latch output from latches 203 and 204 to select, as well as whether to clock the selected latch output into the internal data path using the rising edge or the falling edge of the processor core clock. Delay calculation and timing synchronization unit 207 resynchronizes to the data strobe DQS at every transaction.

Figure 3A:
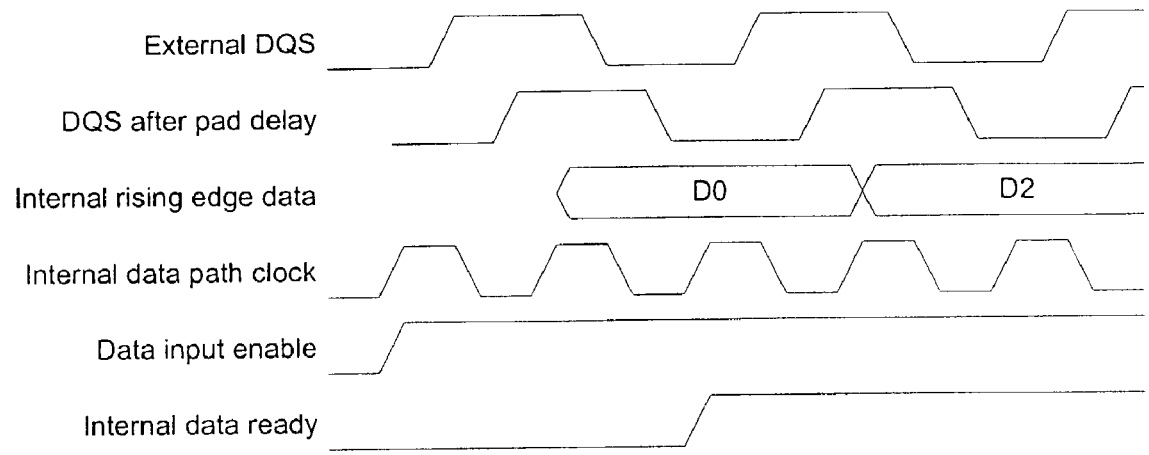
FIGS. 3A and 3B are timing diagrams illustrating operation of a configurable synchronizer according to one embodiment of the present invention.
Figure 3B:
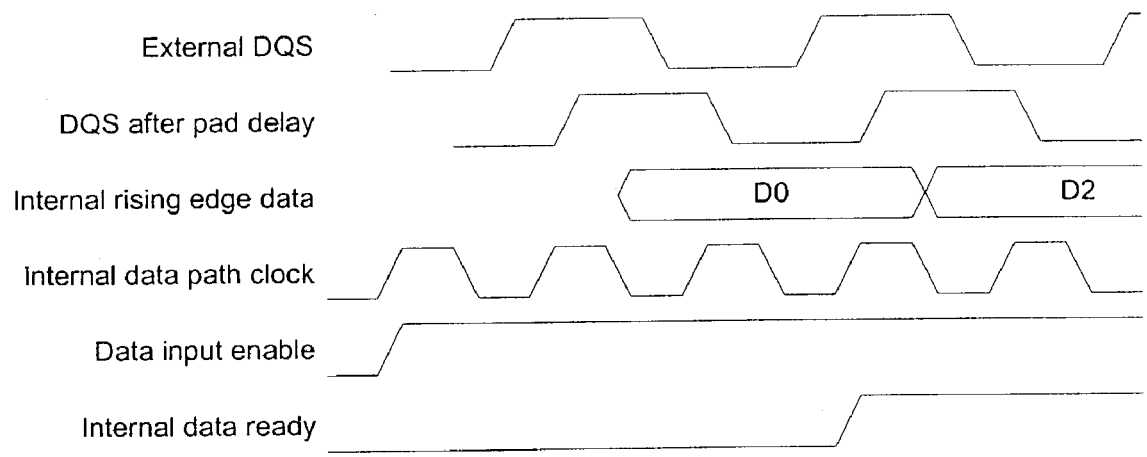

FIGS. 3A and 3B are timing diagrams illustrating operation of a configurable synchronizer according to one embodiment of the present invention. In the examples shown, data is clocked into the internal data path on the rising edge of the processor core clock. FIG. 3A illustrates selected signals during data sampling when the data strobe DQS goes high before the rising edge of the processor core or internal data path clock, while FIG. 3B illustrates the same signals when the data strobe DQS goes high after the processor core or internal data path clock.

FIGS. 3A and 3B illustrate internal pad delays associated with buffering the data strobe DQS into the circuit from an external conductor, as well as associated internal rising edge data. Similar delays and data would attend and accompany the falling edge of the data strobe DQS, handled by a separate instance of the synchronizer. An internal data ready signal, dependent in part on an internal data enable signal, is asserted on the rising edge of the internal data path clock signal one clock cycle after the data strobe signal is asserted.

By sampling the data bus DQ on both the rising and falling edges of the data strobe DQS, delay calculation and timing synchronization unit 207 provides greater flexibility in synchronizing data sampling to the processor core clock. For example, data sampled by latches 201 and 202 may be clocked into latches 203 and 204 after a full cycle of the data strobe DQS—that is, after the second rising edge of the data strobe DQS, when latch 202 contains a data sample for data DO while latch 201 contains a data sample for subsequent data D2. Similarly, data sampled by latches 201 and 202 may be clocked into latches 203 and 204 prior to expiration of a half cycle of the data strobe DQS, when latch 201 contains a data sample for data DO while latch 202 still contains a data sample for previous data. As a result, synchronization may be performed within a period equal to one and a half cycles of data strobe DQS.

In addition, clocking data from latches 203 and 204 into the internal data path using either the rising or falling edge of the processor core or internal data path clock allows flexibility in selecting when synchronization occurs, and allows data to be shifted into the internal data path as quickly as possible.

The present invention allows synchronization of data sampling to the data strobe DQS signal on the fly, with a high tolerance of data strobe DQS timing changes and skew between different data strobe DQS signals in systems that have several data strobe DQS signals. The circuit of the present invention allows synchronization at a wide range of operation frequencies, varying from a data rate from 166 to 400 MT/S. The circuit of the present invention also allows the operating frequency to be changed on the fly without the need to reset and restart the circuit. Still further the circuit of the present invention eliminates extra sampling of data due to noise at both the beginning and the end of each transaction, increasing the circuit reliability. The timing margins from the data input buffer to the core are improved by using two different flip-flops to sample the data, and clocking the data into the internal data path using either the rising edge or the falling edge of the core clock.

Use of a static predetermined delay to match the timing of the data strobe signal DQS to the internal data path clock does not allow running the device at substantially different frequencies since the predetermination of the delay will only work with on specific frequency (or a small range of frequencies). In addition, timing variations due to differences between SDRAM components or temperature changes are not accommodated when the static predetermined delay is employed in running devices in a real system.

The present invention determines, for each transaction, the actual location of the data strobe DQS with respect to the rising (or falling) edge of the internal data path clock, and decides which edge of the internal data path clock to employ in transferring the sampled data into the core logic. The problem of timing changes when the memory device is operated in a system due to temperature changes or different loads/routing of the SDRAM signals on the printed circuit board (PCB) is automatically accommodated.

Synchronization of data strobe signals occurs on the fly during every memory read transaction in the present invention, allowing the circuit to be employed at different frequencies and with more margin on data strobe timing changes. Predetermined delay(s) of the data strobe signal is not needed, since the circuit adjusts delay on the fly. The data strobe is filtered from any glitches, giving the synchronization circuit more margins.

Since the circuit can pass the data on the rising or falling edge, more flexibility and additional performance gain through reduced latency are achieved. With proper tester positioning of the data strobe DQS, the timing of data into the internal data path can be made constant, allowing testability. Post-sample portions of the data strobe are employed to disable further sampling of data into the circuit to eliminate incorrect behavior. An override mode allows the user to determine the sampling point of the data regardless of the data strobe timing, giving an additional feature for debug actions.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A synchronization circuit comprising:
a sampling circuit sampling a data bus based upon a data strobe signal; and
a synchronizer selecting a rising or falling edge of an internal clock for clocking sampled data into an internal circuit based upon timing of the data strobe signal relative to the internal clock.

2. The synchronization circuit according to claim 1, wherein the synchronizer selects a rising or falling edge of the internal clock for clocking sampled data into the internal circuit for every external memory read transaction.

3. The synchronization circuit according to claim 1, wherein the synchronization circuit does not employ a static delay between the data strobe signal and the internal clock.

4. The synchronization circuit according to claim 1, wherein the sampling circuit samples the data bus on both a rising edge and a falling edge of the data strobe signal.

5. The synchronization circuit according to claim 4, wherein the sampling circuit samples the data bus into a first latch on the rising edge of the data strobe signal and samples the data bus into a second latch on the falling edge of the data strobe signal.

6. The synchronization circuit according to claim 5, wherein the synchronizer selects between an output of the first latch and an output of the second latch when selecting the rising or falling edge of the internal clock for clocking sampled data into the internal circuit.

7. The synchronization circuit according to claim 5, further comprising:
a glitch filter filtering the data strobe signal, an output of the glitch filter clocking the first and second latches.

8. A processor including a synchronization circuit according to claim 1, the processor further comprising:
an internal data path including the internal circuit receiving the sampled data.

9. A data processing system including synchronization circuit according to claim 1, the data processing system further comprising:
a processor containing the synchronization circuit; and
at least one double data rate synchronous dynamic random access memory coupled to the synchronization circuit.

10. A synchronization method comprising:
sampling a data bus based upon a data strobe signal; and
selecting a rising or falling edge of an internal clock for clocking sampled data into an internal circuit based upon timing of the data strobe signal relative to the internal clock.

11. The synchronization method according to claim 10, further comprising:
selecting a rising or falling edge of the internal clock for clocking sampled data into the internal circuit for every external memory read transaction.

12. The synchronization method according to claim 10, wherein a static delay between the data strobe signal and the internal clock is not employed.

13. The synchronization method according to claim 10, falling comprising:
sampling the data bus on both a rising edge and a falling edge of the data strobe signal.

14. The synchronization method according to 13, further comprising:
sampling the data bus into a first latch on the rising edge of the data strobe signal and sampling the data bus into a second latch on the falling edge of the data strobe signal.

15. The synchronization method according to claim 14, further comprising:
selecting between an output of the first latch and an output of the second latch when selecting the rising or falling edge of the internal clock for clocking sampled data into the internal circuit.

16. The synchronization method according to claim 14, further comprising:
filtering glitches from the data strobe signal.

17. A synchronization circuit comprising:
a first latch sampling a data bus based upon a rising edge of a data strobe signal;
a second latch sampling the data bus based upon a falling edge of the data strobe signal; and
a timing unit selecting a rising or falling edge of an internal clock for clocking outputs of the first and second latches into an internal circuit base upon timing of the data strobe signal relative to the internal clock.

18. The synchronization circuit according to claim 17, further comprising:
a glitch filter filtering the data strobe signal, wherein the first latch is clocked by an output of the glitch filter and the second latch is clocked by an inverse of an output of the glitch filter.

19. The synchronization circuit according to claim 18, further comprising:
a third latch having an input receiving an output of the first latch; and
a fourth latch having an input receiving an output of the second latch,
wherein the third and fourth latches are selectively clocked by either a rising or falling edge of the internal clock.

20. The synchronization circuit according to claim 19, further comprising:
a selection circuit for selecting an output of the third or fourth latch for transfer into the internal circuit concurrently with selecting the rising or falling edge of the internal clock for clocking outputs of the first and second latches.

21. The synchronization circuit according to claim 20, wherein the selected output is clocked into the internal circuit one internal clock cycle after the data strobe signal is received by the synchronization circuit.

22. The synchronization circuit according to claim 17, wherein the timing unit selects the rising or falling edge of the internal clock for clocking outputs of the first and second latches into the internal circuit for each external memory read transaction.

* * * * *

UNITED STATES PATENT AND TRADEMARK OFFICE
CERTIFICATE OF CORRECTION

| | | |
|---|---|---|
| PATENT NO. | : 7,177,379 B1 | Page 1 of 1 |
| APPLICATION NO. | : 10/425974 | |
| DATED | : February 13, 2007 | |
| INVENTOR(S) | : Elias Shihadeh et al. | |

It is certified that error appears in the above-identified patent and that said Letters Patent is hereby corrected as shown below:

Column 6, Line 8, change "falling" to --further--

Signed and Sealed this

Seventh Day of August, 2007

JON W. DUDAS
*Director of the United States Patent and Trademark Office*